Sept. 22, 1931. C. W. VAN RANST 1,823,997
AUTOMOBILE CONSTRUCTION
Filed Oct. 11, 1929 3 Sheets-Sheet 1
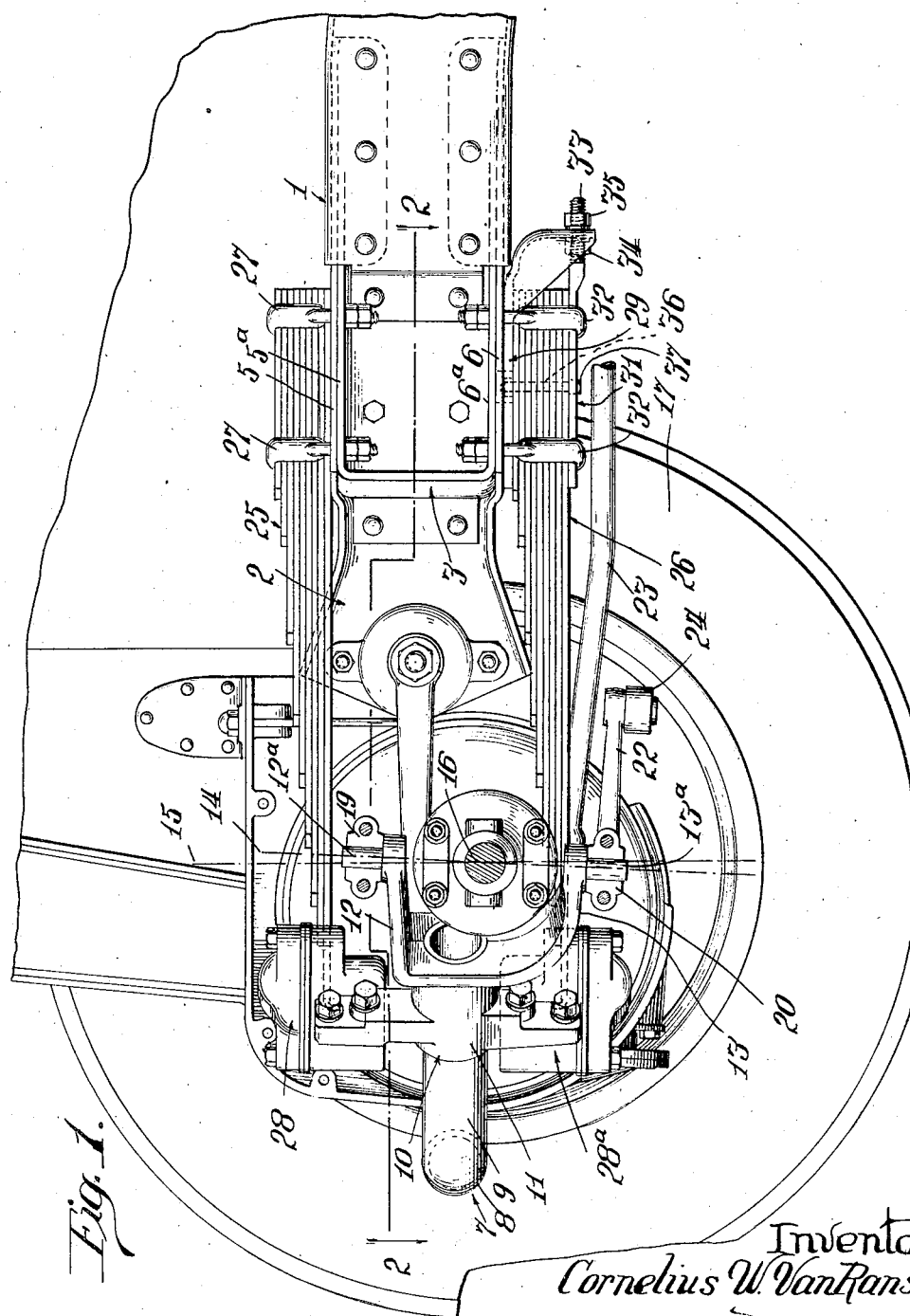

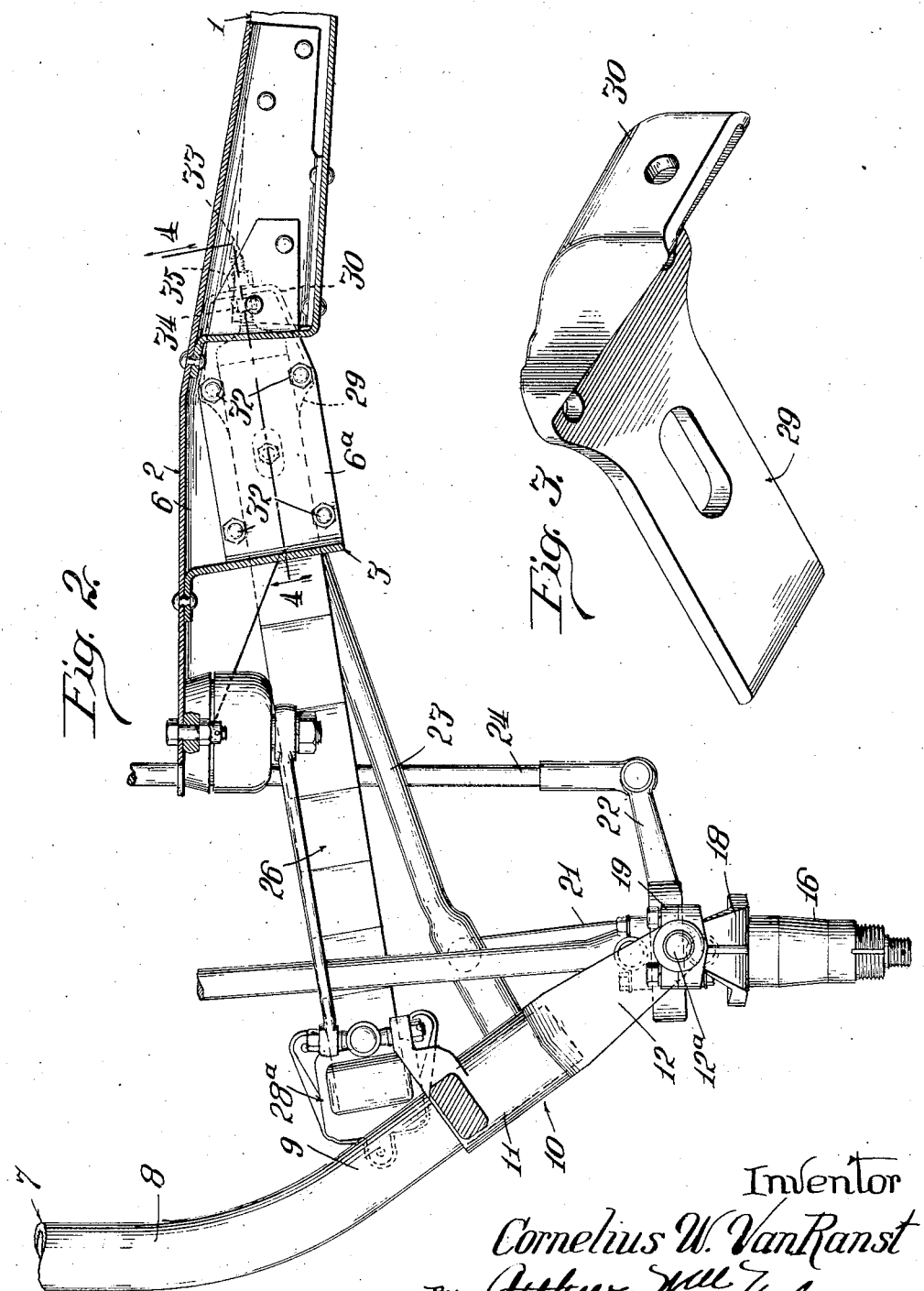

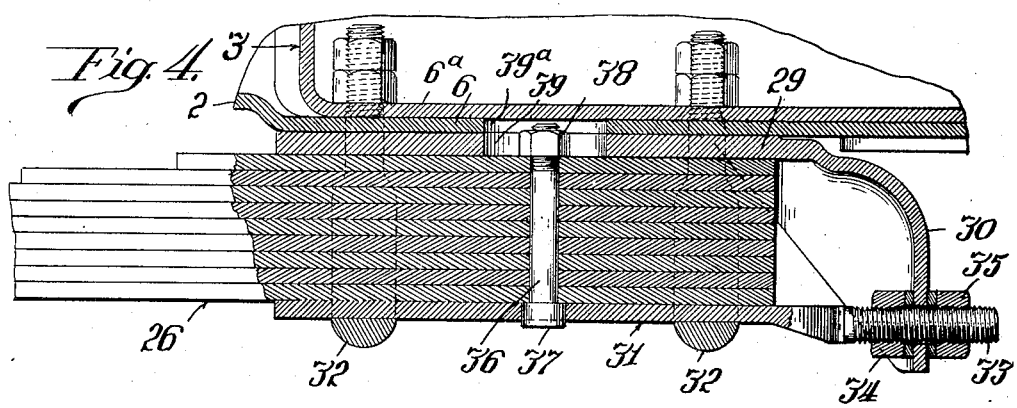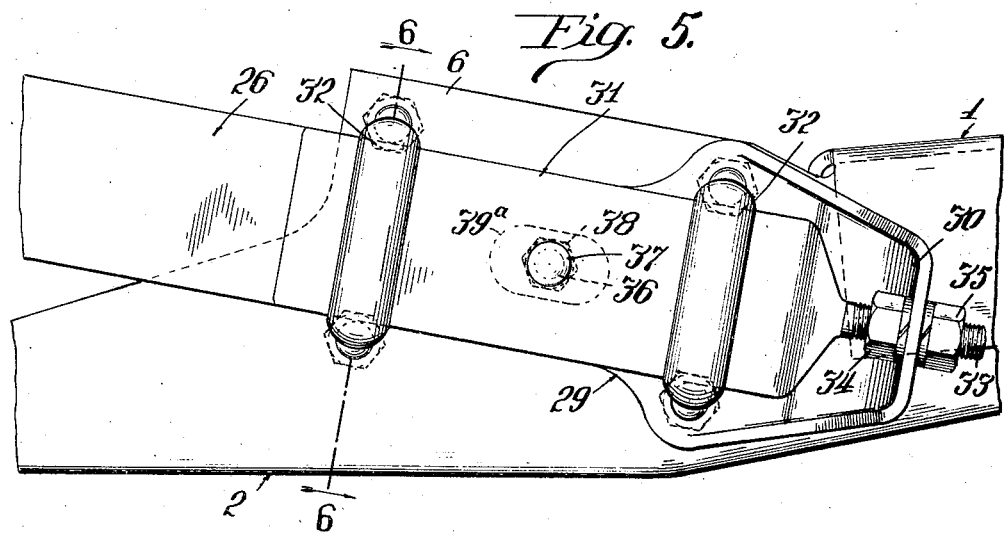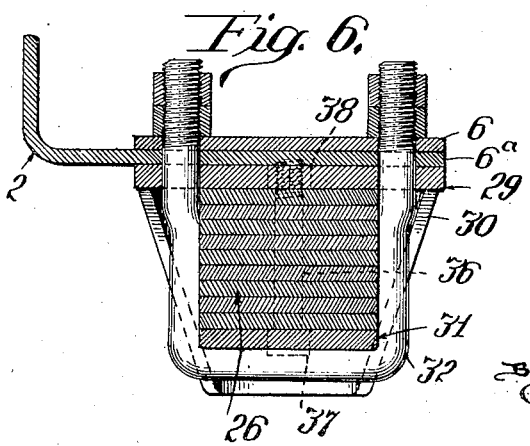

Patented Sept. 22, 1931

1,823,997

UNITED STATES PATENT OFFICE

CORNELIUS W. VAN RANST, OF AUBURN, INDIANA, ASSIGNOR TO MANNING & CO., OF CHICAGO, ILLINOIS, A CORPORATION OF ILLINOIS

AUTOMOBILE CONSTRUCTION

Application filed October 11, 1929. Serial No. 398,878.

This invention relates to improvements in automobile constructions and it consists of the matters hereinafter described and more particularly pointed out in the appended claims.

The invention is particularly adapted for use in front wheel driven automobiles including a dead front axle to which the driven front wheels are connected for steering or caster movement by means of spindles disposed at the ends of said axle, and which axle is operatively connected to the front end of the frame by means of top and bottom vertically yielding members in the form of associated sets of leaf springs.

The primary object of the invention is to provide a novel construction whereby the desired angular position of caster action spindles may be readily attained and which construction may be readily adjusted as occasion demands to maintain said position.

Another object of the invention is to provide such a construction which consists of but a few parts so disposed as to be easily accessible and simple for actuation in adjustment.

These objects of the invention, together with others, as well as the many advantages thereof, will more fully appear as I proceed with my specification.

In the drawings:

Fig. 1 is a view in side elevation of the front end portion of a front drive automobile embodying my invention, with one wheel removed to better illustrate the arrangement of the parts thereof.

Fig. 2 is a horizontal sectional view through the same as taken on the line 2—2 of Fig. 1.

Fig. 3 is a perspective view of a certain bracket embodied in my invention and which will be more fully referred to later.

Fig. 4 is a longitudinal detail vertical sectional view on an enlarged scale as taken on the line 4—4 of Fig. 2.

Fig. 5 is a bottom plan view of the parts shown in Fig. 4.

Fig. 6 is a transverse vertical detail sectional view as taken on the line 6—6 of Fig. 5.

Referring now in detail to that embodiment of the invention illustrated in the accompanying drawings, 1 indicates the front end of one of the side frame members of a front drive automobile which has rigidly fixed to its extremity, an extension member 2 with which is associated a reinforcing bracket 3. Both the extension 2 and bracket 3 have top and bottom engaging flanges 5—5$^a$, and 6—6$^a$, respectively, which provide seats for the attachment of associated supporting springs as will soon appear.

7 indicates the horizontally disposed front axle of the automobile. Said axle, which is preferably tubular in cross-section, includes a transversely extending mid portion 8 and a rearwardly inclined portion 9 at each end. To the extremity of each end portion is fixed a yoke 10 including a body 11 and top and bottom vertically spaced arms 12 and 13, respectively. Said arms carry oppositely facing spindle studs 12$^a$ and 13$^a$, the axes of which are disposed in a plane slightly inclined from the perpendicular as is best illustrated by the comparative dotted lines 14 and 15, respectively, in Fig. 1.

16 indicates a tubular spindle upon which an associated front wheel 17 has suitable rotative bearing. Said spindle is provided at its inner end with top and bottom arms 18, each of which carries a split bearing 19 and 20, respectively, at its extremity to receive the spindle studs 12$^a$ and 13$^a$, respectively, whereby the wheels may caster or turn in a steering movement. In this respect the bottom split bearing 20 of the left front wheel includes a knuckle thrust arm 21 and a steering knuckle thrust arm 22. The arm 21 is connected to the usual thrust rod 23 and the thrust arm 22 is connected to a similar arm on the other side of the car by a drag link 24. Thus, when the thrust rod 23 is actuated, it is apparent that the wheels 17 turn about the spindle studs 12$^a$ and 13$^a$ as an axis, the inclined plane of which is indicated by the dotted line 14.

The axle 7 is operatively connected to each side frame member 1 by substantially longitudinally extending, vertically spaced top and bottom members in the form of approximately quarter elliptic springs 25 and 26, respectively. Each spring is made up of a plurality or a set of associated spring leaves of successively increasing lengths with the major leaf of each set at the bottom and with the minor leaf of each set at the top thereof as best shown in Fig. 1.

The rear ends of the leaves of the top set 25 are grouped together in a well-known manner and are secured to the seat provided therefor on the flange 5 of the extension member 2 by means of longitudinally spaced U-shaped clamp bolts 27—27. Said bolts extend down through the flange 5 and the flange 5ª of the associated filler bracket 3 to receive the usual nuts to securely connect said end of the spring to the frame. The front end of the main leaf of said set 25 overhangs the body 11 of the yoke 10 on the associated end of the axle where it is operatively secured in the top one of a pair of top and bottom shock insulated housings 28 and 28ª, respectively, supported from said yoke 10.

The rear ends of the spring leaves of the bottom spring 26 are secured in a manner different from that of the top spring and which will now be described. Between the minor leaf of the spring 26 and the bottom flange 6 of the extension member 2 is provided a bracket-like plate 29 having a downwardly depending shoulder 30 at its rear end suitably flanged for strength. Seated up against the bottom surface of the rear end of the major leaf of the spring 26 is an adjusting plate 31 and longitudinally spaced U-shaped clamping bolts 32—32 are employed to secure said spring leaves and plate to the associated extension 2. As best shown in Figs. 4, 5 and 6, the threaded ends of the rear clamping bolt 32 pass up through the widened rear end of the plate 29 and then through the flanges 6 and 6ª, respectively, to receive the usual nuts whereby said bolt may be tightly drawn into place. The threaded top ends of the front clamping bolt 32 extend up through the said flanges 6 and 6ª, respectively, whereby they may receive the usual nuts so that said bolt may be tightly drawn home. Said ends of said front bolt may or may not pass through the plate 29 and as shown herein do not pass through said plate.

The rear end of the bottom plate 31 is made in the form of a threaded extension 33 which passes through the plate shoulder 30 and receives coacting nuts and washers 34 and 35, respectively, one on each side of said shoulder. A pin or bolt 36 arranged between the U bolts 32 extends through and has a snug fit in the adjusting plate 31 and all the spring leaves of the set and is provided at its bottom end with a head 37 and receives a nut 38 at its top end which is disposed in longitudinally extending slots 39 and 39ª formed in the top plate 29 and flange 6 of the extension 2. By tightening up on said nut, the spring leaves are securely clamped together at this point. The front end of the main leaf of said spring 26 is operatively secured in the bottom rubber shock insulated housing 28ª before mentioned.

Each front wheel 17 is driven by a shaft 40 from the differential 41 by means of a universal joint 42 disposed in the plane of the spindle studs 12ª and 13ª, respectively. As the means just above mentioned forms no part of the present invention, it is not illustrated in detail nor is it thought necessary to so describe the same here.

In the use of an automobile embodying my invention, as when driving along a road or the like, the obstructions or bumps therein engaged by the wheel tend to swing or cant the axle 7 downwardly in an arc about the wheel spindles as an axis. Such action, of course, will tend, through the shock insulators 28 and 28ª, to pull the top spring forwardly and push the bottom spring rearwardly and thus throw the spindle studs 12ª and 13ª, respectively, out of the normal plane as indicated by the dotted line 14 toward a perpendicular and abnormal plane as indicated by the dotted line 15. Should such a condition arise, it is apparent that steering will be effected and rendered harder by throwing out of normal position all parts of the steering mechanism directly connected to the wheels.

To remedy such a condition, should the same arise, the clamping bolts associated with both springs are slightly loosened and by loosening up the nut 34 and tightening up the nut 35 on the plate extension 33, the adjusting plate 31 is moved forwardly. As said plate 31 and all the leaves of the spring 26 are secured together as by the bolt 36 before mentioned, said spring is moved bodily forward and will exert a thrust upon the bottom shock insulator housing 28ª to swing the axle 7 upwardly again into normal horizontal position and thus restore or return the spindle studs to position in the normal inclined plane. With such studs again disposed as described, it is apparent that all steering mechanism parts will likewise be returned to their normal position with a resulting return of proper operation as originally intended. All nuts heretofore loosened are again tightened up to lock all parts in their newly adjusted normal position.

The improved construction is not only advantageous in maintaining true caster spindle action but provides means whereby the spindle studs may be correctly positioned in the original assembly of the automobile.

The construction mentioned is strong and rigid and is disposed for easy accessibility for adjustment when so necessary.

While in describing the invention, I have referred in detail to the form, arrangement and construction of the various parts thereof, the same is to be considered merely as illustrative so that I do not wish to be limited

I claim as my invention:

1. An automobile embodying therein a frame, an axle, top and bottom springs carried by the frame and operatively connected to the axle, wheel steering spindles carried by the axle, and means operable through one of the springs for adjustably positioning the axes of the wheel steering spindles.

2. An automobile embodying therein a frame, an axle, springs carried by the frame and operatively connected to the axle, wheel steering spindles carried by the axle, and means acting through the springs for adjustably positioning the axes of the wheel steering spindles.

3. An automobile embodying therein a frame, an axle, springs carried by the frame and operatively connected to the axle, wheel steering spindles carried by the axle, and means carried in part by the frame and operative through the springs for adjustably positioning the axes of the wheel steering spindles.

4. An automobile embodying therein a frame, an axle, springs carried by the frame and operatively connected to the axle, wheel steering spindles carried by the axle, and means carried by both the frame and one of said springs and operative for adjustably positioning the axes of the wheel steering spindles.

5. An automobile embodying therein a frame member, an axle, top and bottom spring members arranged substantially parallel with the frame and operatively connecting the same with said axle, a wheel steering spindle carried by the axle, and means carried in part by the frame member and operatively connected to one of said springs for adjustably positioning the axis of the wheel steering spindle.

6. An automobile embodying therein a frame member, an axle, top and bottom spring members arranged substantially parallel with the frame and operatively connecting the same with said axle, a wheel steering spindle carried by the axle, and means carried in part by the frame member and operatively connected to the bottom spring for adjustably positioning the axis of the wheel steering spindle.

7. An automobile embodying therein a frame member, an axle, top and bottom spring members arranged substantially parallel with the frame member and operatively engaged at their ends with the frame member and axle respectively, a wheel steering spindle carried by the axle, a bracket fixed to the frame and associated with one of said spring members and a member fixed with respect to one of said springs and operatively engaged with the bracket for an adjusting movement.

8. In an automobile, a frame member, a set of spring leaves arranged as a substantial extension of said frame member, means for clamping one end of said set of spring leaves to said frame, means providing a shoulder fixed with respect to said frame member adjacent said end of the spring and a device fixed with respect to said end of said leaves and engaged with said shoulder in a manner permitting a longitudinal adjustment thereof.

9. In an automobile, a frame member, a set of spring leaves arranged as a substantial extension of said frame member, a bracket member providing a shoulder near one end of said leaves, means for clamping said end of said leaves to said frame member, and for securing said bracket to said frame member, and a device fixed with respect to said end of said spring leaves and adjustably connected to said shoulder.

10. In an automobile, a frame member, a set of spring leaves arranged as a substantial extension of said frame member, a bracket member providing a shoulder near one end of said leaves, means for clamping said end of said leaves to said frame member, a plate associated with one of the leaves of the spring and means for securing said leaves and plate against movement in one direction, said plate having an end portion adjustably connected to said shoulder.

In testimony whereof, I have hereunto set my hand, this 7th day of October, 1929.

CORNELIUS W. VAN RANST.